(12) United States Patent  (10) Patent No.: US 9,416,910 B2
Schaller  (45) Date of Patent: Aug. 16, 2016

(54) METHOD FOR CONNECTING CONNECTION PIECE TO THERMALLY INSULATED CONDUIT PIPE

(71) Applicant: Brugg Rohr AG Holding, Brugg (CH)

(72) Inventor: Werner Schaller, Hausen (CH)

(73) Assignee: BRUGG ROHR AG HOLDING, Brugg (CH)

(*) Notice: Subject to any disclaimer, the term of this patent is extended or adjusted under 35 U.S.C. 154(b) by 18 days.

(21) Appl. No.: 14/373,752

(22) PCT Filed: Jan. 21, 2013

(86) PCT No.: PCT/CH2013/000012
§ 371 (c)(1),
(2) Date: Jul. 22, 2014

(87) PCT Pub. No.: WO2013/110204
PCT Pub. Date: Aug. 1, 2013

(65) Prior Publication Data
US 2014/0352832 A1 Dec. 4, 2014

(30) Foreign Application Priority Data
Jan. 23, 2012 (CH) .......................................... 98/12

(51) Int. Cl.
*F16L 11/00* (2006.01)
*F16L 59/18* (2006.01)
(Continued)

(52) U.S. Cl.
CPC ............. *F16L 59/181* (2013.01); *B23P 19/04* (2013.01); *F16L 11/15* (2013.01); *F16L 33/223* (2013.01); *Y10T 29/49952* (2015.01)

(58) Field of Classification Search
USPC .................................. 138/104, 121, 149, 109
See application file for complete search history.

(56) References Cited

U.S. PATENT DOCUMENTS 4,415,184 A * 11/1983 Stephenson ............. E21B 17/00
138/149
5,033,513 A * 7/1991 Bartholomew ..... F16L 37/0987
138/109

(Continued)

FOREIGN PATENT DOCUMENTS

CA 2615294 A1 6/2009
EP 0897788 A1 2/1999
(Continued)

OTHER PUBLICATIONS

International search report for PCT/CH2013/000012 dated Jun. 7, 2013.

*Primary Examiner* — James Hook
(74) *Attorney, Agent, or Firm* — McCormick, Paulding & Huber LLP

(57) ABSTRACT

In order to connect a connection piece (10), which is, for example, a pipe coupling or a mounting or a fitting, to a thermally insulated conduit pipe (1), a clamping sleeve (9) with an internal thread (8) is screwed in between the internal pipe (2) of the conduit pipe and the insulation layer (3) of the conduit pipe. A connection body (11) with a plug sleeve (13) is arranged in the internal pipe beforehand. The clamping sleeve (9) acts indirectly on the connection piece (10) by way of a retaining ring (14) in order to press the connection piece against the end face (5) of the internal pipe (2). In this way, the distance between the insulation layer (3) and the casing (4) of the conduit pipe is dispensed with and inaccuracies when cutting the conduit pipe to length can be compensated.

13 Claims, 4 Drawing Sheets

(51) Int. Cl.
*F16L 33/22* (2006.01)
*B23P 19/04* (2006.01)
*F16L 11/15* (2006.01)

(56) References Cited

U.S. PATENT DOCUMENTS

| | | | | |
|---|---|---|---|---|
| 5,654,499 | A * | 8/1997 | Manuli | F16L 11/12 138/104 |
| 7,556,065 | B2 * | 7/2009 | Koizumi | B21D 15/06 138/109 |
| 8,424,924 | B2 * | 4/2013 | LaMarca | B29C 65/3668 285/21.1 |
| 2004/0066035 | A1 * | 4/2004 | Buon | F16L 33/003 285/222.2 |
| 2005/0155661 | A1 * | 7/2005 | Klein | B05B 9/03 138/109 |
| 2006/0196252 | A1 * | 9/2006 | Deckard | F16L 11/127 73/49.5 |
| 2009/0145506 | A1 * | 6/2009 | Queau | F16L 39/005 138/112 |

FOREIGN PATENT DOCUMENTS

| | | |
|---|---|---|
| FR | 822424 A | 12/1937 |
| GB | 1270399 A | 4/1972 |
| WO | 2011009598 A1 | 1/2011 |

* cited by examiner

METHOD FOR CONNECTING CONNECTION PIECE TO THERMALLY INSULATED CONDUIT PIPE

CROSS REFERENCE TO RELATED APPLICATIONS

This application claims the priority of PCT Application No. PCT/CH2013/000012, filed on Jan. 21, 2013 and Swiss Patent Application No. 98/12 filed on Jan. 23, 2012, the disclosures of which are incorporated herein by reference in their entirety.

TECHNICAL FIELD

The invention relates to a method for connecting a connection piece to a thermally insulated conduit pipe, which conduit pipe comprises an internal pipe, an insulating layer and preferably an external casing, the connection piece having a connection body with a plug sleeve that is fastened in the internal pipe, a stop of the stop body coming to rest on the end face of the internal pipe, and a clamping sleeve being introduced from the end face of the internal pipe between the outer wall of the internal pipe and the insulating layer. Moreover, the invention relates to a connection piece which is intended and designed to execute the method and hence to connect to a thermally insulated conduit pipe, which conduit pipe is provided with an internal pipe and an insulating layer, the connection piece having a connection body that is provided with a first stop intended to rest against the end face of the conduit pipe, the stop being adjacent to a plug sleeve intended for insertion into the internal pipe.

PRIOR ART

Thermally insulated conduit pipes are known which have an internal pipe for the medium to be conducted in which the internal pipe is enclosed by an insulating layer to provide thermal insulation. In general, an external casing is also provided. The internal pipe can consist of plastic and be a pipe made of crosslinked polyethylene, for example. The insulating layer can consist of foamed polyurethane or of another foamed plastic. The external casing is also made of plastic, and the conduit pipe can be provided with a corrugation in order to improve its flexibility, or it can be smooth on the outside. One method for the manufacture of such pipes and such a pipe are particularly known from EP-A 0 897 788, for example. Thermally insulated conduit pipes of the type being described are used, for example, in thermal heat networks, drinking water lines, wastewater lines and cold lines. When a connection piece is connected to such a conduit pipe or to a similar thermally insulated conduit pipe on the end face, the external casing and the thermal insulation are first removed in the connection area, thus exposing the internal pipe. A sheath of the connection piece is then attached in the internal pipe, for which purpose a plurality of procedures and designs of connection pieces are available. This known method is elaborate. The portion of the internal pipe from which the thermal insulation is removed must later be insulated again, which is achieved in a known manner by disposing it in a shell that is then filled out with a foaming, thermally insulating material. In WO 2011/009598, it is proposed that a plug sleeve of the connection piece be plugged into the internal pipe, and that a calibration ring be driven in on the internal pipe from the outside. It is evident that this method does not yield optimal results for conduit pipes with an end face that is not exactly perpendicular to the longitudinal axis of the pipe.

SUMMARY OF THE INVENTION

The invention is based on the object of providing another method for connecting a connection piece to a thermally insulated conduit pipe that is suited to conduit pipes that are crosscut in a manner not exactly perpendicular to the longitudinal axis of the pipe.

This is achieved with the method named at the outset in that the connection body bears a retaining ring that forms, on one of its ends, a second stop for the end face of the conduit pipe and that is attached at its other end to the connection body, that the clamping sleeve has an internal thread and a rear collar and extends over the retaining ring, and that the clamping sleeve is screwed on the internal pipe until the rear collar rests against the second stop.

As a result of the connection body being pressed by the clamping sleeve indirectly against the internal pipe by means of the retaining ring, a good fit of the connection body on the front side of the internal pipe is achieved due to the elasticity of the retaining ring. Another advantage involves the clamping sleeve, which applies a circumferential stress or radial force to the internal pipe, thus fixing the plug sleeve. A circular cylindrical shape of the internal pipe can thus also be forced with the clamping sleeve in the connection area, which promotes the tightness of the connection without the need to expose the internal pipe for that purpose. The insulating layer and the casing therefore remain intact in the connection area, and the work steps for the removal thereof are eliminated. The plug sleeve of the connection piece is thus fastened in a substantially exactly circular cylindrical internal pipe and fixed therein in a sealing manner. The clamping sleeve absorbs the radial force of the plug sleeve on the internal pipe.

In one preferred embodiment, the retaining ring also constitutes an indicator that makes it possible to determine whether the clamping sleeve is inserted far enough into the conduit pipe and screwed far enough onto the internal pipe. The retaining ring is preferably made of plastic, and the other parts of the connection body are also preferably made of plastic. In another preferred embodiment, the plug sleeve is provided with several circumferential external ribs that are spaced from the front end of the plug sleeve at alternating distances along its periphery. If need be, other formations such as nubs or points are provided in addition to or instead of the ribs. For one, the ribs form seals for the fluid transported in the internal pipe. For another, they provide anti-twist protection against the rotation of the connection piece and the internal pipe, which is also the function of the other formations. In addition, the embodiment of the ribs facilitates the insertion of the plug sleeve into the internal pipe.

The invention further relates to the object of providing an improved connection piece.

This is achieved with the connection piece of the type mentioned at the outset with a retaining ring arranged on the connection body that has, on one end, a second stop with a stop face for the end face of the internal pipe and that has, at its other end, an attachment means by means of which the retaining ring is attached to the connection body. The connection piece has a clamping sleeve with an internal thread that extends over the retaining ring, and the clamping sleeve has a collar at its rear end with a bearing face that is intended to rest against a mating face of the other stop.

Since the connection body is pressed with its stop against the end face of the internal pipe indirectly via the retaining ring, better adaptation to the position of the end face of the internal pipe is achieved as a result of the elasticity of the retaining ring. The embodiment of the clamping sleeve with an internal thread makes screwing onto the internal pipe possible, which enables a more uniform attachment of the connection piece—and more precise attachment in terms of the pressing force of the connection body against the internal pipe. At the same time, the clamping sleeve offers the advantage of the calibration of the internal pipe, so that the plug sleeve can lie in a uniform manner that provides a good seal. These advantages also apply to the method of connecting the connector piece to a thermally insulated conduit pipe.

Preferably, the plug sleeve is embodied integrally with the connection body, and the means of attachment of the retaining ring is an attachment flange that engages in a groove in the connection body. Both measures, whether implemented individually or together, result in an especially simple construction. Furthermore, it is preferred that the retaining ring form an indicator, particularly by means of a color of the retaining ring that differs from the connection body, by means of which it can be indicated that the clamping sleeve has been screwed correctly or sufficiently into the conduit pipe. This enables the person establishing the connection of conduit pipe and connection piece to ensure in a simple manner that they have screwed the clamping sleeve in such that the connection is sufficiently solid. It is also preferred that the ribs be spaced from the front end of the plug sleeve at alternating distances, which secures the abovementioned advantages. It is also preferred that the clamping sleeve have at least one gripping means for the positive gripping of a tool, which enables the screwing-in of the clamping sleeve on the internal pipe and between the latter and the thermal insulation using a suitable tool.

BRIEF DESCRIPTION OF THE DRAWINGS

Below, exemplary embodiments of the invention will be explained in further detail.

DESCRIPTION OF THE PREFERRED EMBODIMENTS

Figure 1:
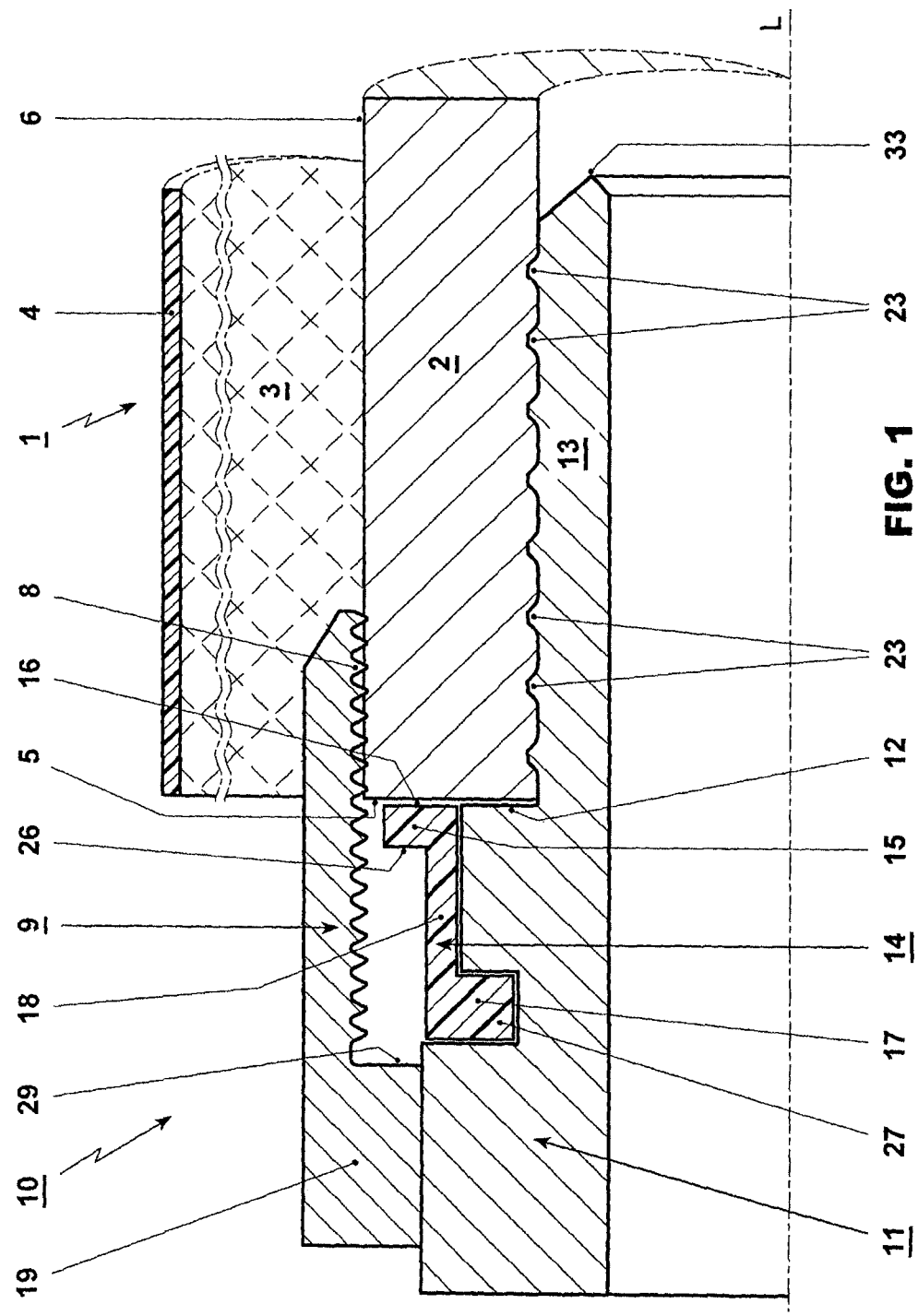
FIG. 1 shows a sectional view through the end of a conduit pipe with a connection piece attached thereto according to one embodiment of the invention before the complete screwing-on of the clamping sleeve onto the internal pipe.
Figure 2:
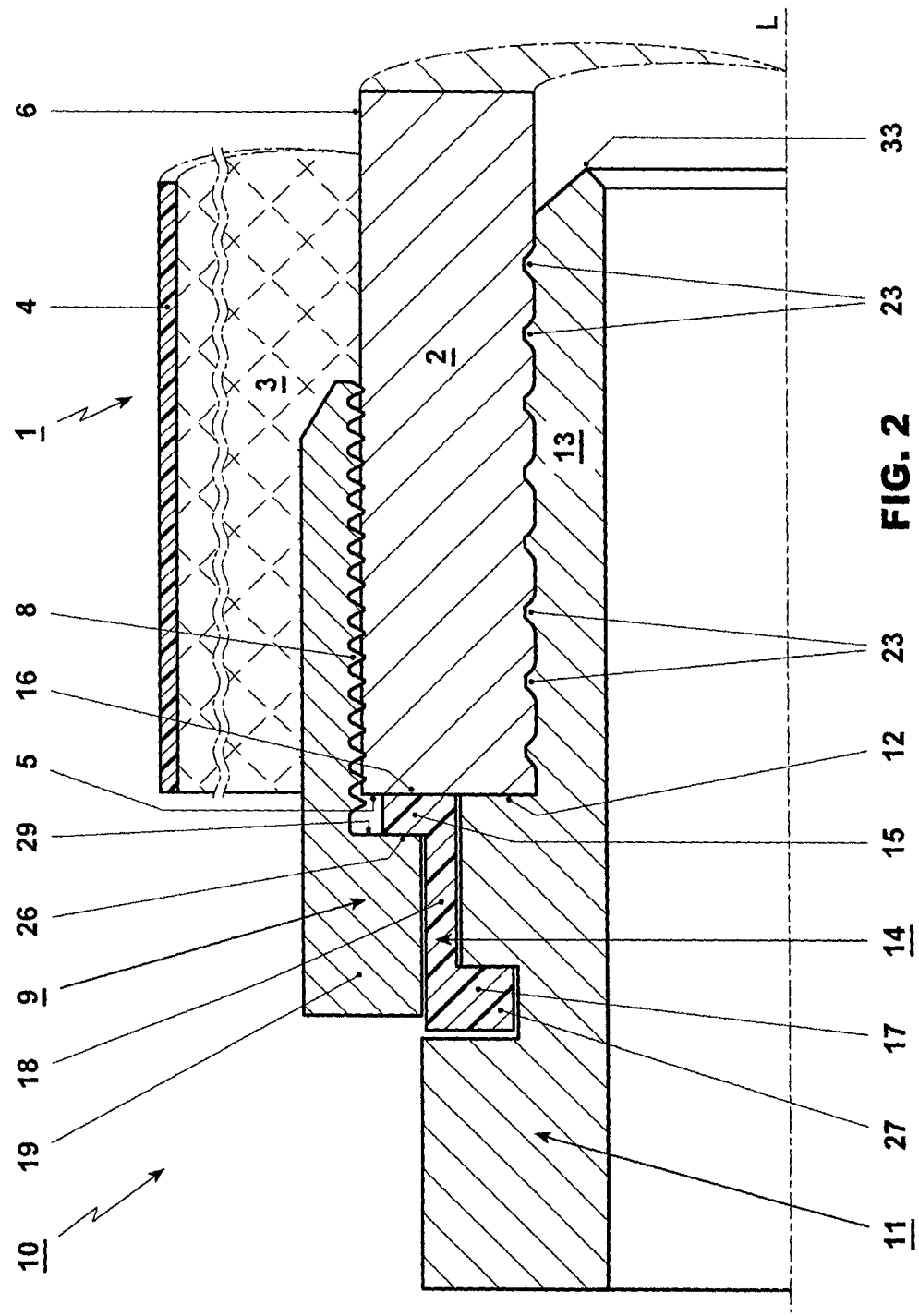
FIG. 2 shows a sectional view according to FIG. 1 with completely screwed-on clamping sleeve.

FIGS. 1 and 2 show a sectional representation through the end region of a conduit pipe, with the longitudinal axis L of the conduit pipe lying on the sectional plane. To simplify the figure, only a portion of the rotationally symmetrical conduit pipe and of the connection piece (which is substantially rotationally symmetrical in the connection area) are shown above the longitudinal axis L. The connection piece can have any known design or function as a pipe coupling or fitting or armature and be commensurately embodied with the conduit pipe outside of its depicted connection area. In particular, the connection piece can be embodied the same on another end as on the end shown. The conduit pipe has a thermal insulation (not shown in full thickness) that respectively encloses the internal pipe, and preferably an external casing. Particularly, the thermal insulation and the external casing are corrugated. Such a conduit pipe can particularly be embodied and manufactured according to EP-A 897 788.

The conduit pipe 1 is embodied with the external casing 4 made of plastic and the foamed thermal insulation or insulation layer 3, which is preferably made of a polyurethane foam. The thermal insulation encloses the internal pipe 2 and rests against its outer wall 6. To simplify the drawing, the conduit pipe is not shown as a corrugated pipe but as a smooth pipe. The method and the connection piece can be used in both types of pipe. A connection piece 10 is attached to the end of the conduit pipe 1 in the manner described below. The connection piece 10 has a connection body 11 that is provided with a plug sleeve 13 that is designed for insertion into the internal pipe 2 of the conduit pipe. The outer diameter of the plug sleeve is thus adapted to the inner diameter of the internal pipe 2, thus enabling precisely fitting insertion and a fluid-tight connection to the inner wall of the internal pipe. In the preferred embodiment shown, the plug sleeve 13 has ribs 23, which will be explained below. Alternatively or in addition, the plug sleeve could be provided with other sealing means, such as with at least one O-ring.

Adjacent to the plug sleeve 13, the connection body 11 has a stop 12 that comes to rest against the end face 5 of the internal pipe 2 when the plug sleeve 13 is plugged in completely. Arranged on the connection body 11 is a retaining ring 14 that particularly has the lying Z-shape visible in cross section in FIGS. 1 and 2. The retaining ring 14 forms a second stop 15 for the end face of the internal pipe 2 and rests with the stop face 16 against the end face 5 when the connection has occurred between conduit pipe and connection piece. The stop 15 of the retaining ring 14 is embodied, for example, as a continuous annular flange, but it could also have interruptions. In the position of FIG. 1, the stop face 16 of the stop 15 is not yet resting tightly against the end face 5 of the internal pipe 2 but is still a slight distance from it. In the position of FIG. 2, the face 16 of the stop 15 then comes to rest against the end face 5 of the internal pipe 2. The retaining ring is attached at its other end 17 facing away from the stop 15 to the connection body 11. In the depicted example, this attachment is embodied such that a flange 27 of the retaining ring 14 engages in an appropriately embodied groove in the connection body 11, as can be seen in FIGS. 1 and 2. This flange can also be annular and continuous, but it could also have interruptions. However, the attachment of the end 17 of the retaining ring to the connection body 11 can also be achieved by screwing, riveting, gluing or welding. Extending between the stop 15 and the flange 27 and the end 17 of the retaining ring 14 is an annular retaining ring part 18 that can be with or without interruptions and is not rigidly connected to the connection body 11 so that it can elongate when pulled. Nor does this part have to rest directly on the connection body 11. The retaining ring 14 is preferably made of a plastic.

A clamping sleeve 9 is arranged above the connection body 11 via the retaining ring 14 and has a sleeve part with an internal thread 8. This internal thread is adapted to the outer diameter of the internal pipe 2, thus enabling the clamping sleeve to be screwed onto the internal pipe. The internal thread has a design, particularly a rounding-off of the thread turns that promotes a rolling of the thread turns on the outer skin of the internal pipe, thus preventing, to the greatest possible degree, the outer skin of the internal pipe 2 from being cut. In this way, a damaging of the internal pipe 2 is prevented to the greatest extent possible. A substantially annular collar 19 is provided at the rear end (when seen in the screwing-in direction) of the clamping sleeve 9 that rests on the connection body 11. Furthermore, a gripping means for a tool is provided at this end of the clamping sleeve 9, which will be explained below, so that the sleeve 9 can be screwed onto the internal pipe with the aid of the tool.

FIG. 1 shows that the plug sleeve 13 has been pushed into the internal pipe 2. The clamping sleeve 9 has already been screwed partially onto the internal pipe 2. It is displacing the thermally insulating insulation 3 of the conduit pipe. This can be facilitated through a special design of the clamping sleeve, which will be explained later. The clamping sleeve 9 continued to be screwed on until its collar 19 comes to rest with its stop face 29 against the stop face 26 of the stop 15 of the retaining ring 14. If the clamping sleeve 9 is screwed a little farther onto the internal pipe 2, the stop 15 is pressed by the clamping sleeve 9 against the end face 5 of the internal pipe 2, and the abovementioned slight space between the stop face 16 of the end face 5 is closed. This can be seen in FIG. 2. As a result, the retaining ring 14 is elastically deformed in its region 18 and, by means of the attachment of the retaining ring 14 with its end 17 to the connection body 11, the connection body 11 is also pressed with its stop against the end face 5 of the internal pipe.

It is preferred here that the retaining ring 14 and the collar 19 of the clamping sleeve be dimensioned such that, when the clamping sleeve is screwed completely on, the retaining ring 14 becomes visible from the outside with its end 17 which—as can be seen in FIG. 2—is the case when the collar 19 has traveled over the end. The retaining ring thus acts as an indicator for the correctly executed connection of the connection piece 10 to the conduit pipe 1. The indicator effect can be improved if the retaining ring 14 is a color different from that of the connection body 11.

Figure 3:
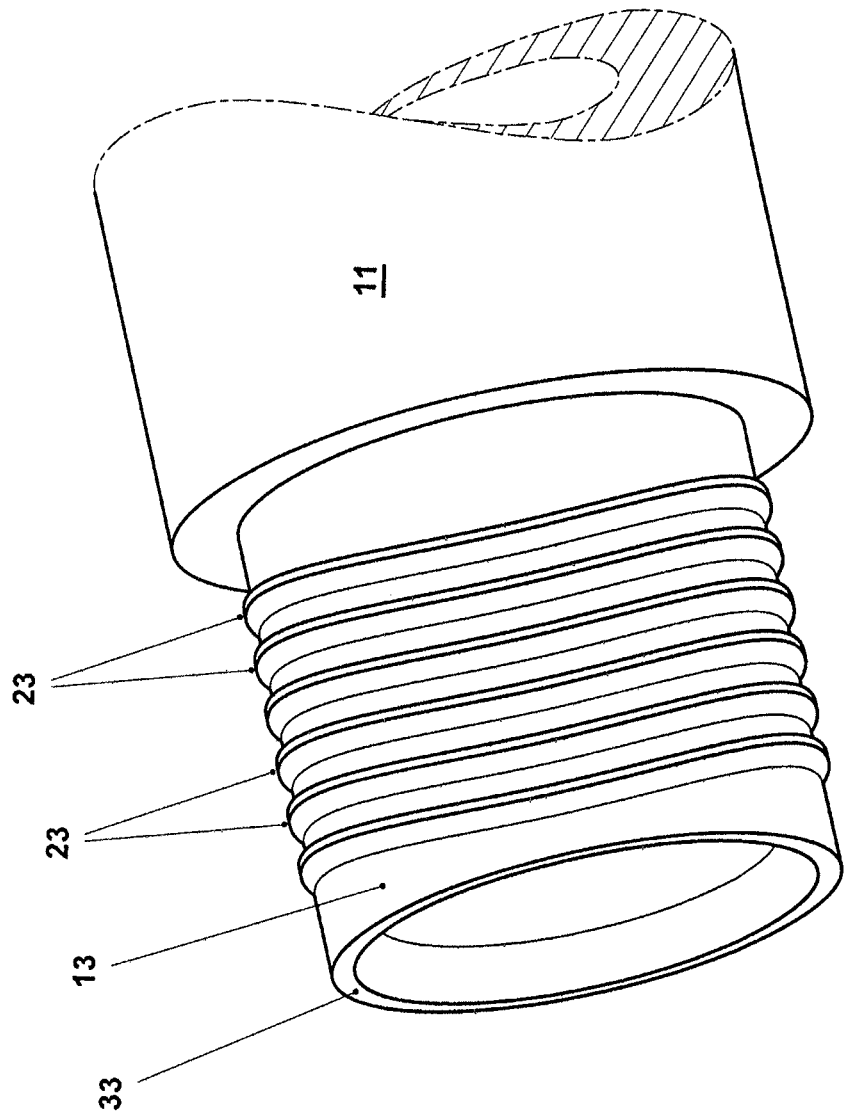
FIG. 3 shows a diagram view of the plug sleeve of the connection body with ribs.

FIG. 3 shows the connection body 11 in highly simplified form in order to explain that ribs 23 can be provided on the plug sleeve 13. These ribs 23 are circumferential raised areas on the plug sleeve that are shown in exaggerated form in FIG. 3 to facilitate illustration. For one, the ribs serve to provide the connection piece with fluid-tightness by pressing into the inner wall of the internal pipe when the clamping sleeve is pushed forward over the internal pipe and screwed onto the internal pipe. For another, they provide anti-twist protection for the connection piece, particularly when they are spaced a different distance from the front end 23 of the plug sleeve 13 along its periphery. The embodiment shown in FIG. 3 is to be understood as an example; the profile of these ribs can be embodied in various ways. The varying distance of the ribs 23 from the end 33 also facilitates the plugging-in or twisting-in or driving-in of the plug sleeve 13 into the internal pipe 2. Additional formations, such as nub- or point-shaped formations, for example, can be provided on the plug sleeve 13 that engage on the inside of the internal pipe and improve the anti-twist protection.

Figure 4:
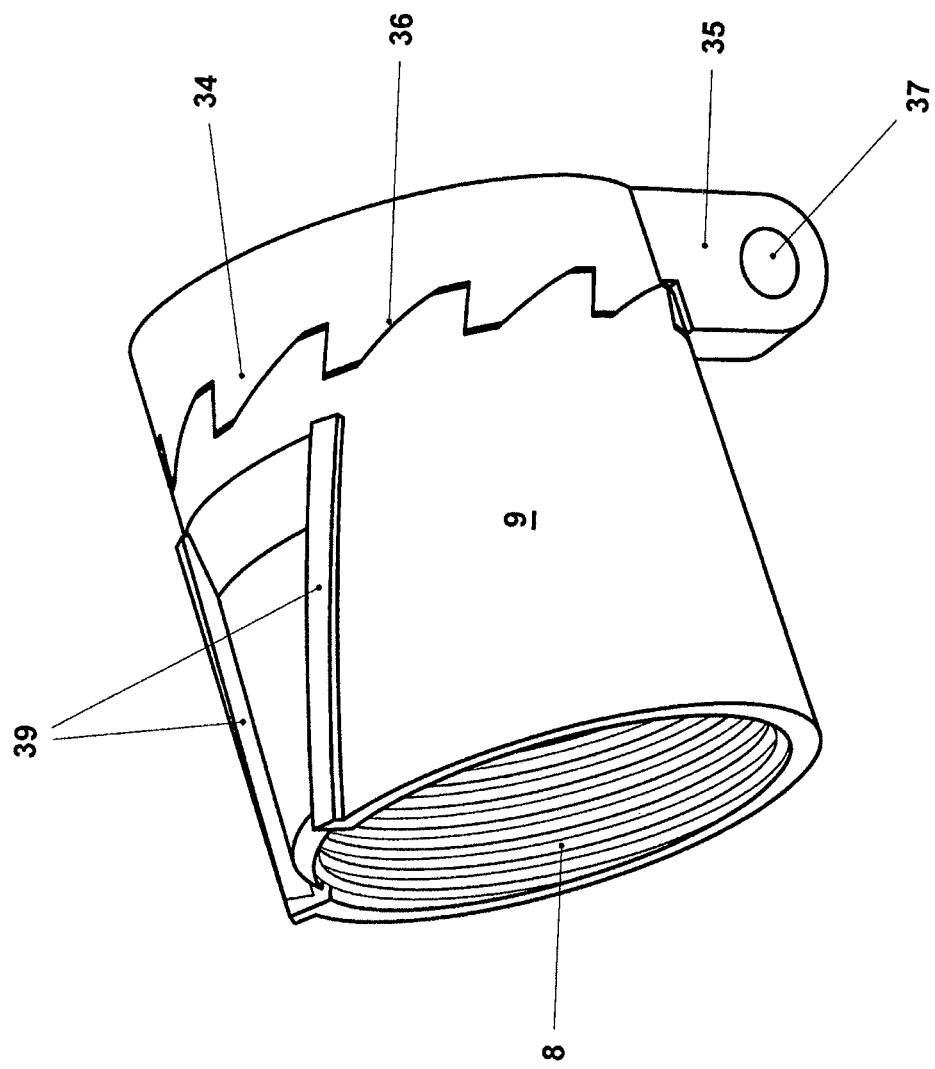
FIG. 4 shows a diagram view of the clamping sleeve with the internal thread and with a tool gripping the clamping sleeve.

FIG. 4 shows an example of the clamping sleeve 9 in which it has cutting means 39 that cuts the thermally insulating insulation 3 when the clamping sleeve is screwed onto the internal pipe 2. This facilitates screwing. Moreover, FIG. 4 shows an example of the gripping means on the clamping sleeve, which consists of toothing 34 in this case, onto which an appropriate tool 35 can be placed with counter-toothing 36. This tool also has receptacles 37 (only one of which is visible in FIG. 4) into which an actuating member can be inserted in order to rotate the clamping sleeve in order to screw it on. Of course, the design of the tool can also be such that the screwing-on of the clamping sleeve 9 can be done by motorized means.

In summary, it can be said that, in order to connect a connection piece 10, which is a pipe coupling or an armature or a fitting, to a thermally insulated conduit pipe 1, a clamping sleeve 9 with an internal thread 8 is screwed in between the internal pipe 2 of the conduit pipe and its insulating layer 3. A connection body 11 with a plug sleeve 13 is arranged beforehand in the internal pipe. The clamping sleeve 9 acts indirectly on the connection piece 11 via a retaining ring 14 in order to press it against the front side 5 of the internal pipe 2. In this way, the removal of the insulating layer 3 and of the casing 4 of the conduit pipe is eliminated. Imprecisions in the cross-cutting of the conduit pipe can also be better compensated.

The invention claimed is:

1. Method for connecting a connection piece (10) to a thermally insulating conduit pipe (1) comprising an internal pipe (2), an insulating layer (3) enclosing the internal pipe (2), and preferably an external casing (4), wherein the connection piece (10) has a connection body (11) with a plug sleeve (13) that is attached in the internal pipe, wherein a stop (12) of the connection body (11) comes to rest against the end face (5) of the internal pipe (2), and wherein a clamping sleeve (9) is introduced from the end face of the internal pipe between the outer wall (6) of the internal pipe (2) and the insulating layer (3), characterized in that the connection body (11) bears a retaining ring (14) that forms on one of its ends a second stop (15) for the end face (5) of the internal pipe and that is attached at its other end (17) to the connection body (11), that the clamping sleeve (9) extends over the retaining ring (14) and has an internal thread (8) and a rear collar (19), and that the clamping sleeve (9) is screwed onto the internal pipe (2) until the rear collar (19) abuts the second stop (15).

2. Method as set forth in claim 1, characterized in that the retaining ring (14) constitutes an indicator in that the other end (17) of the retaining ring (14) becomes visible when the clamping sleeve (9) is screwed sufficiently onto the internal pipe (2).

3. Method as set forth in claim 1, characterized in that the plug sleeve (13) has several circumferential external ribs (23) that are spaced from the front end (33) of the plug sleeve at alternating distances along its periphery.

4. Connection piece (10) which is intended and designed to execute the method as set forth in claim 1 and hence to connect to a thermally insulated conduit pipe (1), which conduit pipe is provided with an internal pipe (2) and an insulating layer (3), the connection piece (10) having a connection body (11) that is provided with a first stop (12) intended to rest against the end face (5) of the conduit pipe, and the stop being adjacent to a plug sleeve (13) of the connection body intended for insertion into the internal pipe (2), characterized in that the connection piece also has a retaining ring (14) arranged on the connection body (11) that has, on one end, a second stop (15) with a stop face (16) for the end face (5) of the internal pipe and that has, at its other end (17), an attachment means (27) by means of which the retaining ring (14) is attached to the connection body (11), and that the connection piece has a clamping sleeve (9) with an internal thread (8) that extends over the retaining ring (14), and that the clamping sleeve (9) has a collar (19) at its rear end with a bearing face (29) that is intended to rest against a mating face (26) of the other stop (15).

5. Connection piece as set forth in claim 4, characterized in that the plug sleeve (13) is embodied integrally with the connection body (11).

6. Connection piece as set forth in claim 4, characterized in that the attachment means of the retaining ring (14) is an attachment flange (27) that engages in a groove in the connection body (11).

7. Connection piece as set forth in claim 4, characterized in that the retaining ring (14) constitutes an indicator, particularly through a color of the retaining ring that differs from the connection body (11), by means of which sufficient screwing of the clamping sleeve into the conduit pipe can be indicated.

8. Connection piece as set forth in claim 4, characterized in that the plug sleeve (13) has several circumferential external ribs (23) that are spaced at alternating distances from the front end (33) of the plug sleeve along its periphery.

9. Connection piece as set forth in claim 4, characterized in that the clamping sleeve (9) has at least one gripping means for the positive gripping of a tool.

10. Connection piece as set forth in claim 4, characterized in that the clamping sleeve (9) has, on its outer side in the region of the internal thread (8), at least one means of displacement for displacing the thermally insulating insulation (3) of the conduit pipe (1).

11. Connection piece as set forth in claim 10, wherein the at least one means of displacement includes a cutting means (39).

12. Arrangement of a thermally insulating conduit pipe (1) with an internal pipe (2) and an insulating layer (3), and preferably with an external casing (4), and a connection piece as set forth in claim 4.

13. Arrangement as set forth in claim 12, wherein the conduit pipe is a corrugated pipe.

\* \* \* \* \*